(12) United States Patent
Herman et al.

(10) Patent No.: US 12,707,428 B2
(45) Date of Patent: Aug. 11, 2026

(54) RIDER IDENTIFICATION SYSTEMS AND METHODS USING MOTION SENSING

(71) Applicant: Ford Global Technologies, LLC, Dearborn, MI (US)

(72) Inventors: David Michael Herman, West Bloomfield, MI (US); Alexander George Shanku, Grosse Pointe Park, MI (US)

( * ) Notice: Subject to any disclaimer, the term of this patent is extended or adjusted under 35 U.S.C. 154(b) by 527 days.

(21) Appl. No.: 18/046,057

(22) Filed: Oct. 12, 2022

(65) Prior Publication Data

US 2024/0129888 A1 Apr. 18, 2024

(51) Int. Cl.
*H04W 64/00* (2009.01)

(52) U.S. Cl.
CPC ................................ *H04W 64/006* (2013.01)

(58) Field of Classification Search
CPC ..... H04W 72/23; H04W 24/10; H04W 16/28; H04W 64/00; H04W 24/08; H04W 72/046; H04W 56/001; H04W 80/02; H04W 76/15; H04W 40/20
See application file for complete search history.

(56) References Cited

U.S. PATENT DOCUMENTS

| | | | |
|---|---|---|---|
| 10,989,547 B2 | 4/2021 | Hamilton et al. | |
| 2017/0153714 A1 | 6/2017 | Gao et al. | |
| 2020/0272143 A1* | 8/2020 | Scott .................... | B60W 10/06 |
| 2021/0374623 A1 | 12/2021 | Dyer et al. | |
| 2021/0403055 A1 | 12/2021 | Jeromin et al. | |
| 2022/0371544 A1* | 11/2022 | Brown .................. | B60R 25/252 |
| 2023/0095218 A1* | 3/2023 | Livne .................. | G06N 3/0464<br>382/118 |

OTHER PUBLICATIONS

Ami Woo et al., Localization for Autonomous Driving, Handbook of Position Location: Theory, Practice adn Advances, Second Edition, Chapter 29, Jan. 2019.

* cited by examiner

*Primary Examiner* — Kwasi Karikari
(74) *Attorney, Agent, or Firm* — Emily Campbell; Eversheds Sutherland (US) LLP

(57) ABSTRACT

Rider identification systems and methods using motion sensing are disclosed herein. An example method includes obtaining a location of a mobile device associated with an individual, obtaining sensor data from the mobile device that includes a first motion profile, the sensor data also including environment information around the location, generating a motion model for the individual using the environment information, generating a second motion profile using the motion model, comparing the second motion profile to the first motion profile, and confirming when the second motion profile matches the first motion profile to confirm that the individual is at the location.

17 Claims, 6 Drawing Sheets

RIDER IDENTIFICATION SYSTEMS AND METHODS USING MOTION SENSING

BACKGROUND

When using ride-hailing services, such as transportation as service (TAAS) applications, which can include autonomous vehicle-based (AV) services (can include other systems such as Advanced Driver Assistance as well), rider identification can be difficult. In typical TAAS (e.g., non-autonomous), a human driver may motion or gesture to an individual to confirm whether the person is the intended customer. For example, the individual may be talking/looking on/at their cell phone. In other situations, the driver and passenger may coordinate with one another by waving one's hand to correctly identify the person. An AV service has similar challenges in determining subtle human interactions.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
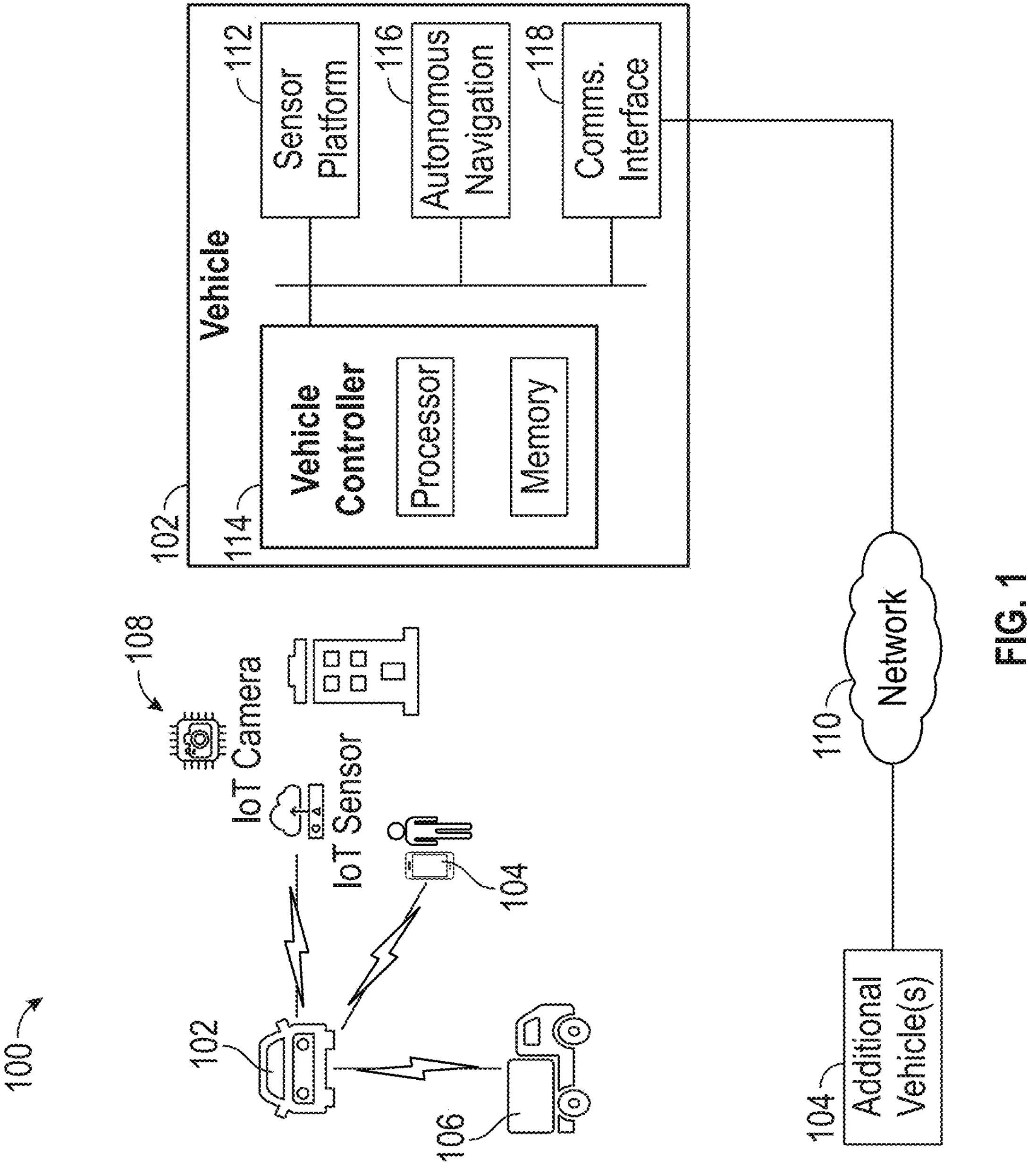
FIG. 1 illustrates an example environment in accordance with one or more embodiments of the present disclosure.

Disclosed are systems and methods for customer localization based on sensor data analytic(s) such as video analysis and smart device acceleration. A user's smart device may monitor acceleration signals of the smart device, which may indicate certain movements of the user. Vehicle or infrastructure sensors (e.g., cameras) can be used to determine the location of the smart device on the person and the locomotion and direction of the person. In this manner, the sensor data from the smart device and the sensor data from the vehicle or other infrastructure may be cross-referenced to determine the approximate location of the user.

Once the smart device is located, estimating the gait of the individual may be performed of one or more individuals visible in the field of view of the vehicle. For example, signals and/or data from the smart device and surrounding infrastructure can be used to determine, for example, if, how, and when the individual is walking, stepping over curbs, walking up steps, waving, or performing other physical motions. Assuming a vehicle controller can locate the approximate customer/smart device location using GPS, a cell tower, Wi-Fi, signal triangulation, or another suitable method-based localization, the vehicle controller can use sensor data, such as cameras, LIDAR, and other sensors, to detect pedestrians via the sensor data. The sensor data can be obtained from a vehicle sensor platform and/or other connected vehicles (V2V/vehicle-to-vehicle) or infrastructure elements (V2X) over a vehicle-to-everything link.

A visible smart device held (or otherwise carried) by the person may also be identified. A skeletal model of human motion/gait can then be predicted by the vehicle controller using this data. Alternatively, a human action predictor may be used when the model has less confidence in the prediction of gait. For example, the vehicle controller can consider a target pedestrian walking between zero and ten seconds, and from ten seconds onward, the target pedestrian may be inferred to be standing or sitting.

The vehicle controller may compute the potential smart device acceleration profile given each individual's digital skeletal model, assuming the smart device is located in a possible physical location of the person (or multiple locations). This may be compared to the actual smart device acceleration available via the customer's TAAS application on their phone to correctly identify a customer or identify a non-customer. In some cases, where direct comparison is difficult (e.g., crowded and/or obscured areas), the vehicle may request specific actions, e.g., for the true customer to waive a hand in the air or do the robot while holding their smart device, thereby improving confidence in the prediction. When the customer is located, the vehicle may move towards the customer and park. In other cases, however, the vehicle may not identify a match between observed human gaits detected using vehicle sensors and that of the customer's smart device prediction and move to regions of reduced occlusion where the customer may be located. In other embodiments, the vehicle may request video data from remote sources (e.g., vehicles and infrastructure over V2X) for local processing in an attempt to localize the customer. An example of additional sensor data could include data from a Smart device, as well. Thus, a fusion of sensor output can be used from a plurality of sources.

In one configuration, a system can include the user's smart device and the vehicle's controller and/or sensor system. At the user's smart device, a TAAS application may be used to initiate ride service, share the smart device's location, and allow for data collection from the smart device. At the user's smart device, acceleration and/or gyro data may be collected, and the user's acceleration profile may be shared with a TAAS vehicle. At the vehicle, a request from a customer may be obtained, and GPS coordinates may be obtained for location approximation. The vehicle further may obtain an acceleration profile of a customer from the smart device. At the vehicle, an onboard sensor system may be used to generate skeletal models of pedestrians within a customized fixed distance. The skeletal models may be used to generate acceleration profiles over a range of potential smart device locations and predicted acceleration profiles are compared to true profiles. The vehicle controller can detect if the confidence of a match is above a threshold. In one non-limiting example, a method can be performed to use a weighted ensemble given confidence of detectors (e.g. confidence of cell phone is in pocket vs cell phone in hand). The complexity of the data can be broken down into a series of arrays (e.g. vertical acceleration of cell phone assuming cell phone in hand) and then a statistical correlation can be performed with outlier mitigation.

If the confidence is below the threshold, pedestrian action can be requested or the vehicle can switch to an action profile analysis. The vehicle can be moved closer to the customer and/or can otherwise indicate to the customer that the vehicle has found the customer.

Illustrative Embodiments

FIG. 1 illustrates an example environment where aspects of the present disclosure may be practiced. The environment 100 includes a vehicle 102, a smart device 104 associated with a rider, one or more additional vehicles 106, infrastructure elements 108, and a network 110. In addition to the rider associated with the smart device 104, the environment 100 can be occluded or occupied by other pedestrians, infrastructure, vehicles, and other objects.

The network 110 may include any one or a combination of multiple different types of networks, such as cable networks, the Internet, wireless networks, and other private and/or public networks. In some instances, the network 110 may include cellular, Wi-Fi, or Wi-Fi direct. This network can include vehicle-to-vehicle communications, as well as vehicle-to-everything communications. Any suitable network may be used herein.

Figure 2:
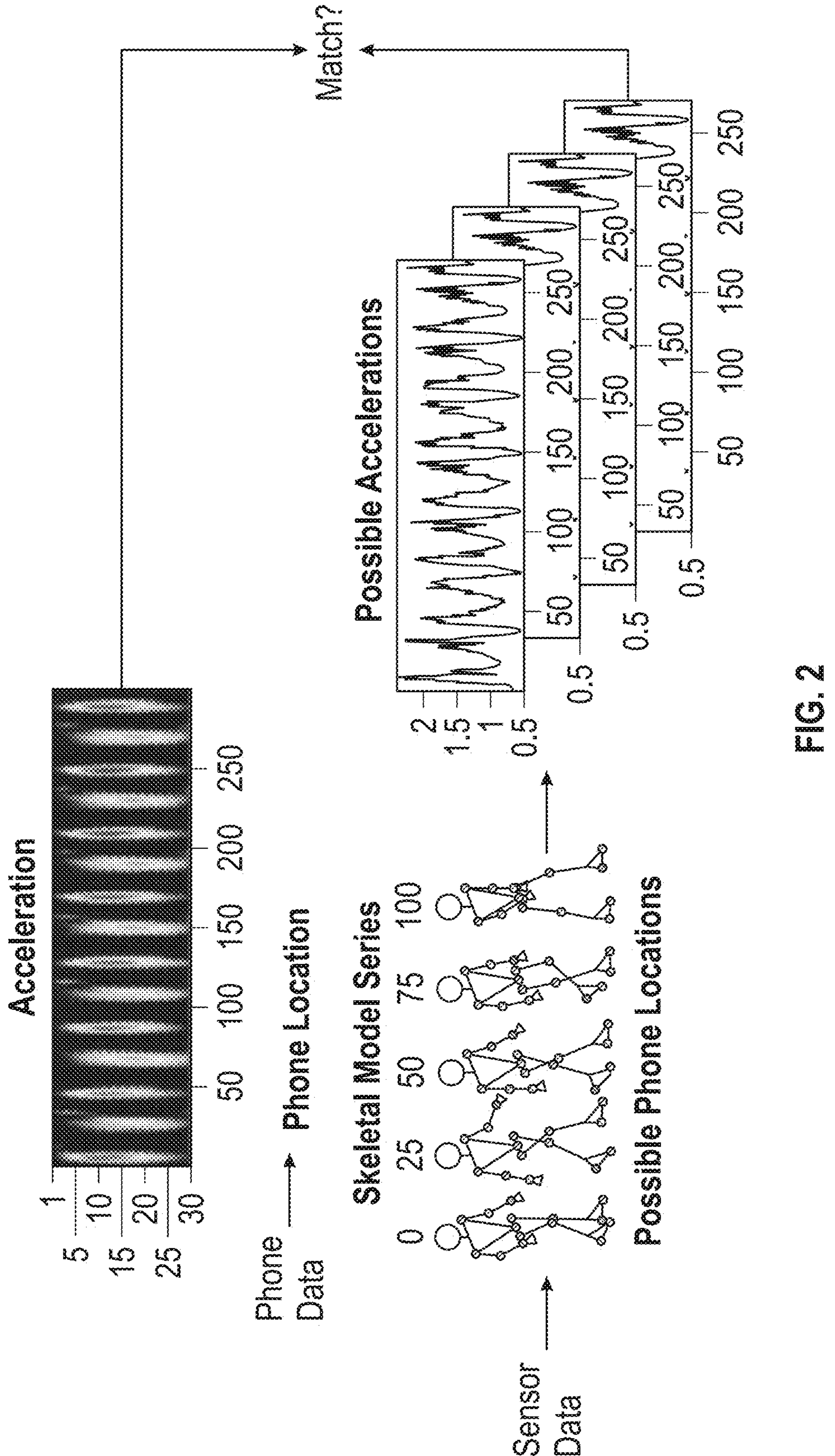
FIG. 2 diagrammatically illustrates an example method involving a smart device and enabled vehicle in accordance with one or more embodiments of the present disclosure.

FIG. 2 diagrammatically illustrates an example overall process for detecting rider presence from smart device motion profiling. The process includes obtaining phone data (for example smart device) and identifying both phone location information and an acceleration profile for the phone. Correspondingly, sensor data can also be obtained from on-board vehicle sensors (such as cameras), sensors on other vehicles in the area, or from infrastructure elements also in the area. The sensor data can be used to generate skeletal models and gait predictions/pose estimations, as well as possible phone locations. Also, possible or potential acceleration profiles (second motion profile(s)) can be generated from the skeletal models. The potential acceleration profiles can be compared against the acceleration profile for the phone to determine if a match exists. These different skeletal models and acceleration profiles can be generated for various objects in the environment, such as other humans. In this way, when a match is found, the skeletal model and potential acceleration profile can be identified as the rider in question with the smart device that requested the ride.

Referring back to FIG. 1, the smart device 104 associated with the rider can be configured to execute a TAAS application that allows the rider to request a ride from the vehicle 102. The smart device can include any mobile device that is capable of wireless communications, such as a Smartphone. Although not shown, the ride requests can be mediated by a backend service provider in some instances. The smart device 104 includes location sensing capabilities, such as GPS or the equivalent which can be used to determine a location of the smart device 104. The smart device 104 can also include motion sensing elements, such as an accelerometer and/or gyroscope. In some instances, the smart device can also incorporate other visual based sensors such as light sensing determine approximate location of phone. For example, light signals can be obtained during the day and are bright, this may indicate that the device is in hand, attached to belt, or other similar configuration.

The smart device 104 can collect these data and transmit them over the network 110. The motion signals can be generally referred to as a first motion profile. In some instances, the motion signals can be transmitted to the vehicle and a vehicle controller of the vehicle can convert the raw motion signals into a motion profile. In general, the motion signals can be analyzed to determine the motion of the smart device, which is in turn indicative of motion of the rider, such as walking stepping over objects, and so forth. Other use cases can also be estimated such as elevator, escalator usage, and the like. These data may be used to estimate the location of customer and their distance from the vehicle.

The vehicle 102 can comprise a sensor platform 112, a vehicle controller 114, and an autonomous navigation system 116. In general, the vehicle 102 can be connected to the network 110 using a communications interface 118. The vehicle 102 can include an autonomous vehicle in some instances.

The vehicle controller 114 includes a processor and memory, and the memory stores instructions that can be executed by the processor. In general, the vehicle controller 114 can receive a ride request from the smart device 104 and cause the autonomous navigation system 116 to navigate the vehicle 102 to the general location identified by the location signals included in the request.

When the vehicle 102 arrives at the general location, the vehicle controller 114 can activate the sensor platform 112 to obtain sensor data for an environment around the location. The sensor platform 112 can include ultrasonic sensors, LIDAR, radar, radio frequency (RF), cameras, infrared (IR), or other sensors that can be configured to sense objects in the environment 100, namely the rider. In more detail, the sensor output can be used to calculate a gait analysis/pose estimation for human beings, such as the rider that are detected in the sensor output.

In general, the vehicle controller 114 can be configured to predict a human's acceleration profile (to match this generated profile to the first motion profile obtained from the smart device) from gait analysis and/or skeletal profiles. One such approach could involve using input sequences that can contain busy backgrounds with many individuals or other background objects, extracting the rider's pose via a deep learning network, generating a pose sequence, and obtaining an embedded representation of the gait via an additional graph-based neural network. Moreover, this embedded representation can then be used as training data to train a model mapping this embedded gait to an associated acceleration profile.

It should be noted that gait recognition and modeling issues that can arise from situations such as varying clothing on the subjects, and multiple subjects in one scene can be addressed. For example, multiple pedestrians may be in the environment, and confidence in the predicted gait based on vehicle sensors and phone acceleration may be insufficient to produce a correct prediction. The vehicle controller 114 can also track pedestrian instances even under occlusion conditions.

In such cases, the vehicle controller 114 may request the rider to perform some sort of motion, such as walking, skipping, jumping, doing the robot, or other movement to improve the prediction and correlation. Further, smart device-based interactions may improve the prediction of the position of the smart device, such as in the rider's hand. Even in circumstances where the individual is sitting (inclusive of wheel chair bound customers) and thus there is no gait available to predict based on smart device acceleration, this may still provide the ability to filter extraneous pedestrians who are in motion. When no gait is discernable, other biometrics can be used such as pulse, breathing and other minor movements of the body with the phone.

Figure 3:
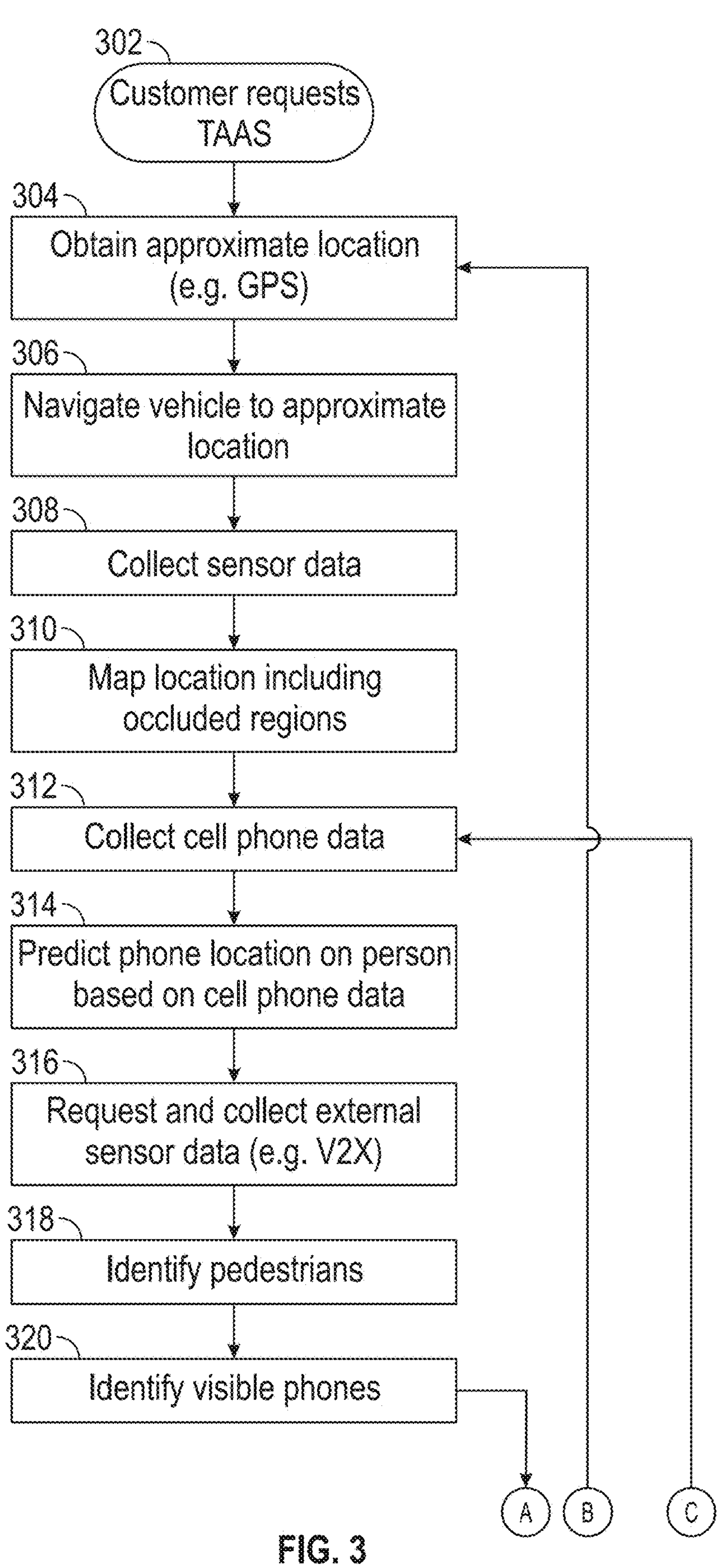
FIG. 3 is a flowchart of an example method in accordance with one or more embodiments of the present disclosure.
Figure 3:
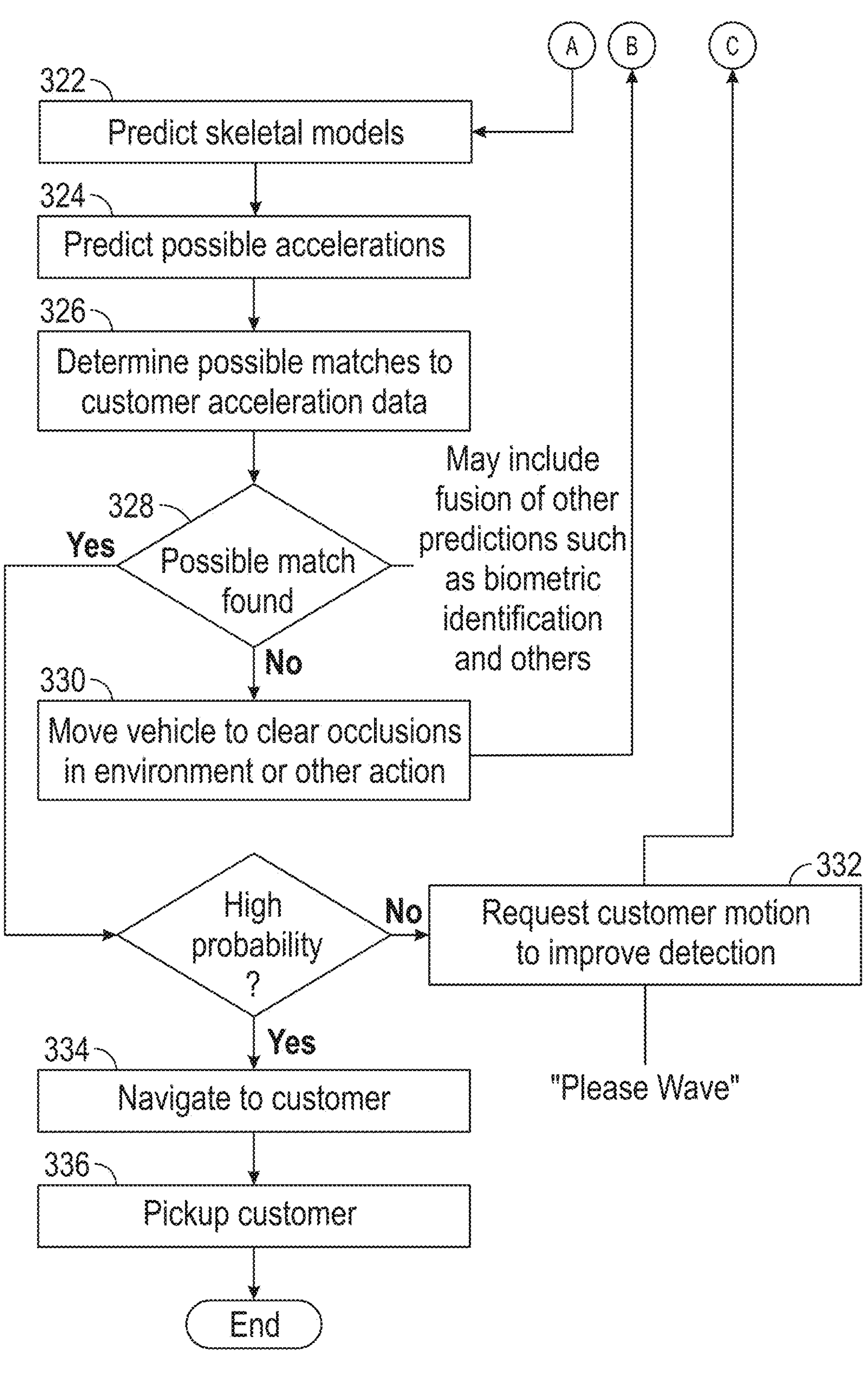

FIG. 3 illustrates a flowchart of an example method of the present disclosure. The method can begin with a step 302 with a customer requesting a ride through a TASS application on their smart device. Next, the method includes a step 304 of obtaining a location of the smart device. For example, a vehicle controller can request the GPS coordinates from the smart device. The smart device can return the location over the network through the TASS application.

In step 306, the vehicle can navigate to the location. This can include either autonomous navigation or navigation by a driver of the vehicle. Once the vehicle arrives at the location provided by the smart device, the vehicle can begin to obtain sensor data of the location in step 308. This can include using sensor data obtained from a vehicle sensor platform. In some instances, sensor data from other vehicles in the location can be requested and obtained over vehicle-to-vehicle connections. Once sensor data have been obtained, the method can include a step 310 of mapping the location (and objects therein) and identifying occluded regions. In general, an occluded region is anywhere an object exists such as humans, vehicles, or infrastructure elements such as street lights, lamp posts, mailboxes, landscaping, and other structure(s). Pre-generated maps of objects can also be used in some instances.

In step 312, data can be obtained from a smart device(s). That is, motion profiles or other location data can be obtained. Location information can be collected in step 314 to infer a general location of the smart device, such as from GPS data. In step 316, sensor data can be obtained from infrastructure elements over V2X connections. For example, a street camera can collect images of the location. In step 318, individuals can be identified from sensor data, along with smart devices in step 320.

In step 322, the method can include predicting skeletal models of the humans identified as disclosed above. The skeletal models can be generated using any method that would be known to one of ordinary skill in the art. In step 324, the method can include predicting possible accelerations (referred to in some instances as a second motion model(s)). This can be achieved by tracking the skeletal models as humans move in the location. In step 326, the method includes determining possible matches to the acceleration data obtained from the smart device. A possible match can be found in step 328 when a potential motion model matches the acceleration data obtained from the smart device within a threshold value. For example, if a potential motion model and the acceleration data obtained from the smart device match 95%, then a match may exist. The threshold value can be set to any sensitivity level. As noted above, this analysis can include predictive data pertaining to biometric data, as well as any other data that can assist in matching a model to the data obtained from the smart device of the rider (or from information known about the rider from a user profile).

When the process in step 328 is hindered by occlusions or objects at the location which makes a profile comparison difficult or impossible, the method can include a step 330 of navigating the vehicle to gain a more unobstructed view of the location. For example, the vehicle controller may determine that the vehicle is partially behind a building or a taller vehicle. The vehicle controller may determine that the rider is located behind a structure, either partially or completely. For example, a rider may be waiting for their ride in a store or in a portico such as a bus stop.

When a high probability match is not determined in step 330, the method can include a step 332 of requesting that the rider perform a motion, such as waiving, jumping, or moving their smart device. This motion can be sensed by the vehicle sensor platform and identified for confirmation by the rider. This allows the vehicle controller to differentiate between objects in motion in the location and the rider that requested the service. The request can be presented to the user on the TASS application on their smart device. However, if a high probability match is determined, the method can include a step 334 of navigating to the rider, as well as a step 336 of picking up the rider and transporting them to their destination. In some instances, the vehicle controller can transmit a message to the mobile device to inform the user that the autonomous vehicle is near their location. Messages can also be displayed when there may be obstructions between the vehicle and the customer/mobile device that instruct the customer to relocate or perform an action.

Figure 4:
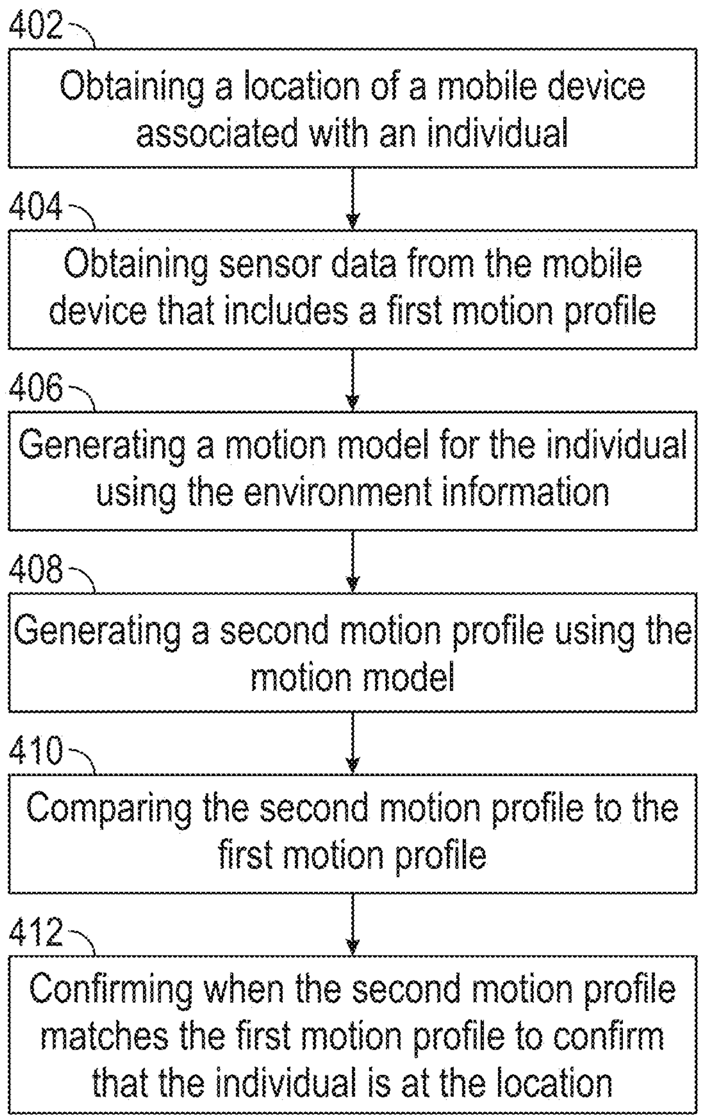
FIG. 4 is a flowchart of another example method in accordance with one or more embodiments of the present disclosure.

FIG. 4 is a flowchart of an example method of the present disclosure. The method can include a step 402 of obtaining a location of a mobile device associated with an individual. This step can occur after a rider has requested a ride through a TASS application. The location of the smart device can be measured in GPS or equivalent location-based data. The method can include a step 404 of obtaining sensor data from the mobile device that includes a first motion profile. For example, accelerometer and/or gyroscopic data can be collected and used for motion profiling. Sensor data can also include environmental information around the location. These data can be collected when the vehicle reaches the location.

Next, the method includes a step 406 of generating a motion model for the individual using the environment information. The motion model can include a skeletal model in some instances. The method can include a step 408 of generating a second motion profile using the motion model. The motion profile infers movement of the smart device based on tracked and modeled movement of an individual. In some instances, a location of the smart device can be ascertained from the modeling as well. Thus, the method can include identifying a position of the mobile device on the individual using the first motion profile.

The method can include a step 410 of comparing the second motion profile to the first motion profile, as well as a step 412 of confirming when the second motion profile matches the first motion profile to confirm that the individual is at the location. That is, the motion of the modeled individual matches the motion of the smart device, thus confirming that the individual is at the location.

Figure 5:
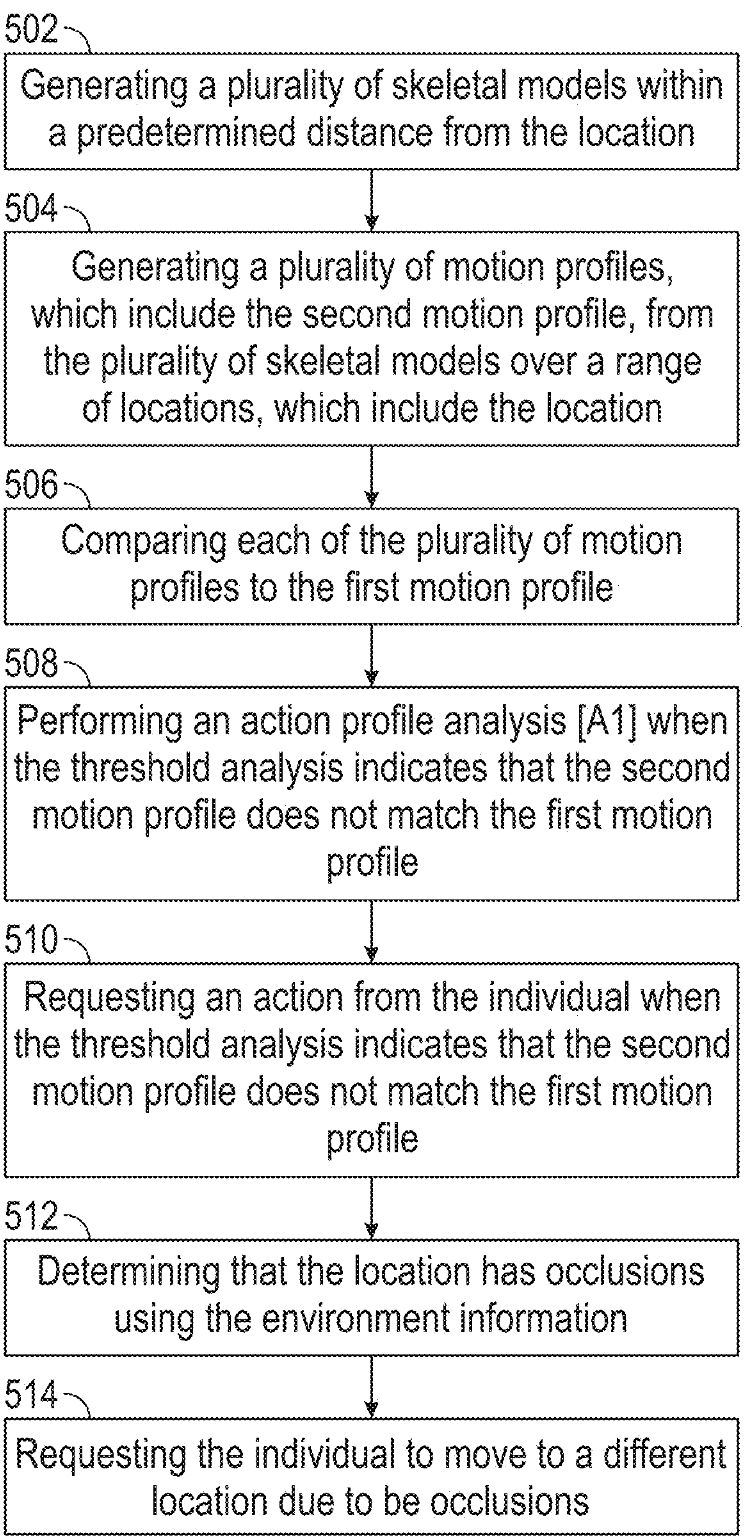
FIG. 5 is a flowchart of an additional example method in accordance with one or more embodiments of the present disclosure.

FIG. 5 is a flowchart of a related method for generating and using skeletal models. The method can include a step 502 of generating a plurality of skeletal models within a predetermined distance from the location. To be sure, these skeletal models pertain to other individuals in the location where the smart device is located.

The method can also include a step 504 of generating a plurality of motion profiles, which include the second motion profile, from the plurality of skeletal models over a range of locations, which include the location. Thus, motion profiles (acceleration profiles) are generated for each of the skeletal models.

In step 506 the method includes comparing each of the plurality of motion profiles to the first motion profile. This step can involve using a threshold analysis (or other similar analysis that would be known to a person of ordinary skill in the art) to perform the comparison as noted above. When a match is not found, the method can include a step 508 of performing an action profile analysis when the threshold analysis indicates that the second motion profile does not match the first motion profile. The method can include a step 510 of requesting an action from the individual when the threshold analysis indicates that the second motion profile does not match the first motion profile. In some instances, the method can include a step 512 of determining that the location has occlusions using the environment information, as well as a step 514 of requesting the individual to move to a different location due to the occlusions. The process can then be repeated to obtain sensor data and determine if the individual/smart device can be identified using modeling.

It will be understood that a pedestrian gait profile is extremely powerful in identifying individuals, without the need to obtain clear facial images and to store customer facial images in a central database. The ability to generate skeletal models, and use those models to extrapolate acceleration profiles over multiple possible phone locations, make the systems and methods disclosed herein apply to use cases outside of the specified use cases disclosed herein. Examples include human/manually driven vehicles in TAAS, identifying individuals in crowds for marketing/advertising purposes (shopping malls, sporting events, trade shows, etc.), and social meetup applications.

An alternative workflow would be for the phone to detect a unique vector descriptor of the rider based on phone acceleration and provide that to the vehicle to be used to compare to detected gait analysis from the vehicle sensors. This scenario assumes that the target is moving during observation (for example not sitting).

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:

obtaining a location of a mobile device associated with an individual;

obtaining sensor data from the mobile device, wherein the sensor data includes a first motion profile and environment information around the location, wherein the first motion profile includes accelerometer or gyroscope data of the mobile device;

determining a motion model for the individual using the environment information;

determining a second motion profile using the motion model;

comparing the second motion profile to the first motion profile;

determining, based on the second motion profile matching the first motion profile, that the individual is at the location;

generating a plurality of skeletal models within a predetermined distance from the location;

generating a plurality of motion profiles, which include the second motion profile, from the plurality of skeletal models over a range of locations, which include the location; and navigating an autonomous vehicle to the location to obtain the environment information.

2. The method according to claim 1, further comprising determining a position of the mobile device on the individual using the first motion profile.

3. The method according to claim 1, further comprising comparing each of the plurality of motion profiles to the first motion profile.

4. The method according to claim 3, further comprising using a threshold analysis to perform the comparison.

5. The method according to claim 4, further comprising performing an action profile analysis based on the threshold analysis indicating that the second motion profile does not match the first motion profile.

6. The method according to claim 4, further comprising requesting an action from the individual based on the threshold analysis indicating that the second motion profile does not match the first motion profile.

7. The method according to claim 1, further comprising navigating the autonomous vehicle closer to the location based on the individual being confirmed to be at the location, as well as transmitting a message to the mobile device to inform a user that the autonomous vehicle is near the location.

8. The method according to claim 1, further comprising:

determining that the location has occlusions using the environment information; and requesting the individual to move to a different location due to the occlusions.

9. A vehicle comprising:

a sensor platform; and a vehicle controller comprising a processor and memory, the processor executing instructions in memory to:

obtain a location of a mobile device associated with an individual;

obtain sensor data from the mobile device that includes a first motion profile and environment information around the location obtained from the sensor platform, the first motion profile including accelerometer or gyroscope data of the mobile device;

generate a motion model for the individual using the environment information;

generate a second motion profile using the motion model;

compare the second motion profile to the first motion profile; and confirm, when the second motion profile matches the first motion profile, that the individual is at the location, wherein the first motion profile includes any of acceleration and gyroscopic data, wherein the processor is configured to:

generate a plurality of skeletal models within a predetermined distance from the location; and generate a plurality of motion profiles, which include the second motion profile, from the plurality of skeletal models over a range of locations, which include the location; and autonomously navigate the vehicle to the location.

10. The vehicle according to claim 9, wherein the processor is configured to compare each of the plurality of motion profiles to the first motion profile.

11. The vehicle according to claim 10, wherein the processor is configured to perform an action profile analysis when a threshold analysis indicates that the second motion profile does not match the first motion profile.

12. The vehicle according to claim 9, wherein the processor is configured to use a threshold analysis to perform the comparison.

13. The vehicle according to claim 11, wherein the processor is configured to request an action from the individual when the threshold analysis indicates that the second motion profile does not match the first motion profile.

14. The vehicle according to claim 9, wherein the processor is configured to cause an autonomous vehicle to the location to obtain the environment information.

15. The vehicle according to claim 9, wherein the processor is configured to cause an autonomous vehicle to navigate to the location when the individual is confirmed to be at the location.

16. The vehicle according to claim 9, wherein the processor is configured to:

determine that the location has occlusions using the environment information; and request the individual to move to a different location due to the occlusions.

17. A method comprising:

obtaining a location of a mobile device associated with an individual;

obtaining sensor data from the mobile device that includes a first motion profile, the sensor data also comprising environment information around the location;

determining a motion model for the individual using the environment information;

determining a second motion profile using the motion model;

comparing the second motion profile to the first motion profile;

determining, based on the second motion profile matching the first motion profile, that the individual is at the location;

determining that the location has occlusions using the environment information; and requesting the individual to move to a different location due to the occlusions.

* * * * *